United States Patent
Ichinokawa (10) Patent No.: US 10,902,823 B2
(45) Date of Patent: Jan. 26, 2021

(54) DISPLAY SYSTEM, DISPLAY CONTROL METHOD, AND STORAGE MEDIUM

(71) Applicant: HONDA MOTOR CO., LTD., Tokyo (JP)

(72) Inventor: Jumpei Ichinokawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/559,819

(22) Filed: Sep. 4, 2019

(65) Prior Publication Data
US 2020/0082793 A1 Mar. 12, 2020

(30) Foreign Application Priority Data
Sep. 11, 2018 (JP) .................... 2018-169672

(51) Int. Cl.
*G09G 5/37* (2006.01)
*G09G 5/38* (2006.01)
*G01C 21/36* (2006.01)
*B60K 35/00* (2006.01)

(52) U.S. Cl.
CPC ............... *G09G 5/37* (2013.01); *G09G 5/38* (2013.01); *B60K 35/00* (2013.01); *B60K 2370/1529* (2019.05); *B60K 2370/52* (2019.05); *G01C 21/365* (2013.01); *G01C 21/3664* (2013.01); *G09G 2354/00* (2013.01)

(58) Field of Classification Search
CPC ........ G09G 5/37; G09G 5/38; G09G 2354/00; B60K 2370/1529; B60K 2370/52; B60K 35/00; G01C 21/365; G01C 21/3664
See application file for complete search history.

(56) References Cited

U.S. PATENT DOCUMENTS

2012/0259546 A1* 10/2012 Kim ..................... G06K 9/0061
701/527
2020/0234067 A1* 7/2020 Hayashi .................... G06T 7/70

FOREIGN PATENT DOCUMENTS

JP 2012-220489 11/2012

* cited by examiner

*Primary Examiner* — Chong Wu
(74) *Attorney, Agent, or Firm* — Amin, Turocy & Watson, LLP (57) ABSTRACT

A display system includes a display configured to display an image, a road shape acquirer configured to acquire a shape of a road around a vehicle, and a display controller configured to cause an image including the road shape acquired by the road shape acquirer to be displayed on the display, and the display controller changes a display aspect of lanes to be displayed on the display, on the basis of whether the number of lanes of the road around the vehicle is an odd number or an even number.

11 Claims, 10 Drawing Sheets

DISPLAY SYSTEM, DISPLAY CONTROL METHOD, AND STORAGE MEDIUM

CROSS-REFERENCE TO RELATED APPLICATION

Priority is claimed on Japanese Patent Application No. 2018-169672, filed Sep. 11, 2018, the content of which is incorporated herein by reference.

BACKGROUND

Field of the Invention

The present invention relates to a display system, a display control method, and a storage medium.

Description of Related Art

In the related art, there is a technology for causing a shape of a road around a traveling vehicle to be displayed on a display device. In relation thereto, a display system in which an image regarding route guidance information for navigation is mapped to an actual road shape with reference to a driver's eye position and displayed on a windshield of a vehicle is known (for example, Japanese Unexamined Patent Application, First Publication No. 2012-220489 A).

SUMMARY

However, in the related art, since a display position of the image regarding the route guidance information frequently changes due to change in the road shape, change in a traveling position of the vehicle, or the like, visibility of an image for an occupant may be impaired.

An aspect of the present invention has been made in consideration of such circumstances, and an object of the present invention is to provide a display system, a display control method, and a storage medium capable of improving visibility of an image to be displayed.

The display system, the display control method, and the storage medium according to the present invention adopt the following configurations.

(1) A display system according to an aspect of the present invention is a display system including a display configured to display an image; a road shape acquirer configured to acquire a shape of a road around a vehicle; and a display controller configured to cause an image including the road shape acquired by the road shape acquirer to be displayed on the display, wherein the display controller changes a display aspect of lanes to be displayed on the display, on the basis of whether the number of lanes of the road around the vehicle is an odd number or an even number.

(2) In the aspect of (1), the display controller is configured to cause a center lane among a plurality of lanes to be positioned and displayed at a center in a width direction of the display when the number of lanes of the road around the vehicle is an odd number, and determine one of the plurality of lanes on the basis of regulations for the road and cause the determined lane to be positioned at the center in the width direction of the display and displayed, when the number of lanes of the road around the vehicle is an even number.

(3) In the aspect of (2), the display controller is configured to cause a traveling lane determined according to regulations for a second lane at a center among a plurality of lanes to be positioned and displayed at the center in the width direction of the display, when the number of lanes of the road around the vehicle is an even number.

(4) In the aspect of (3), the display controller is configured not to change a display aspect of the lane to be displayed on the display when the number of lanes changes from an even number to an odd number due to an increase or decrease in the number of lanes displayed on the display.

(5) In the aspect of (1), the display controller is configured to cause the lanes to be displayed so that a width of a lane positioned at a center in a width direction of the display is greater than widths of other lanes, and the width of the lane on the outside from the center is smaller than the width of the lane positioned at the center.

(6) In the aspect of (1), the display controller is configured to cause lane shape change information indicating a state in which a shape of the lane changes to be displayed on the display when the vehicle has reached a point at which the number of lanes in which the vehicle is able to travel in the same direction as a traveling direction of the vehicle increases or decreases or a point a first predetermined distance before a point at which the lane branches.

(7) In the aspect of (6), the display system further includes a route guide configured to perform guidance for a route to a destination of the vehicle, wherein the display controller is configured to cause information on the route determined by the route guide to be displayed on the display, and cause information on lane change to be displayed on the display when the vehicle reaches a point a second predetermined distance before a point at which the vehicle is to perform lane change on the basis of the route.

(8) In the aspect of (7), the display controller is configured to cause a road sign of a destination to which the branching road is connected to be displayed on the display when the vehicle has reached a point a third predetermined distance before a point at which the lane branches.

(9) In the aspect of (8), the first predetermined distance, the second predetermined distance, and the third predetermined distance are the same distances.

(10) A display control method according to an aspect of the present invention is a display control method including: acquiring, by a computer, a shape of a road around a vehicle; causing, by the computer, an image including the acquired road shape to be displayed on a display; and changing, by the computer, a display aspect of lanes to be displayed on the display, on the basis of whether the number of lanes of the road around the vehicle is an odd number or an even number.

(11) A storage medium according to an aspect of the present invention is a computer-readable non-transitory storage medium storing a program causing a computer to: acquire a shape of a road around a vehicle; cause an image including the acquired road shape to be displayed on a display; and change a display aspect of lanes to be displayed on the display, on the basis of whether the number of lanes of the road around the vehicle is an odd number or an even number.

According to the above (1) to (11), it is possible to improve visibility of an image to be displayed.

DESCRIPTION OF EMBODIMENTS

Hereinafter, embodiments of a display system, a display control method, and a storage medium of the present invention will be described with reference to the drawings.

In the embodiment, an example in which the display system is mounted in a vehicle including a driving assistance device such as advanced driver assistance systems (ADAS) or a navigation device that performs guidance for a route to a destination will be described. In the embodiment, the driving assistance includes, for example, an adaptive cruise control system (ACC), a lane keeping assistance system (LKAS), and a collision mitigation brake system (CMBS).

[Entire Configuration]

Figure 1:
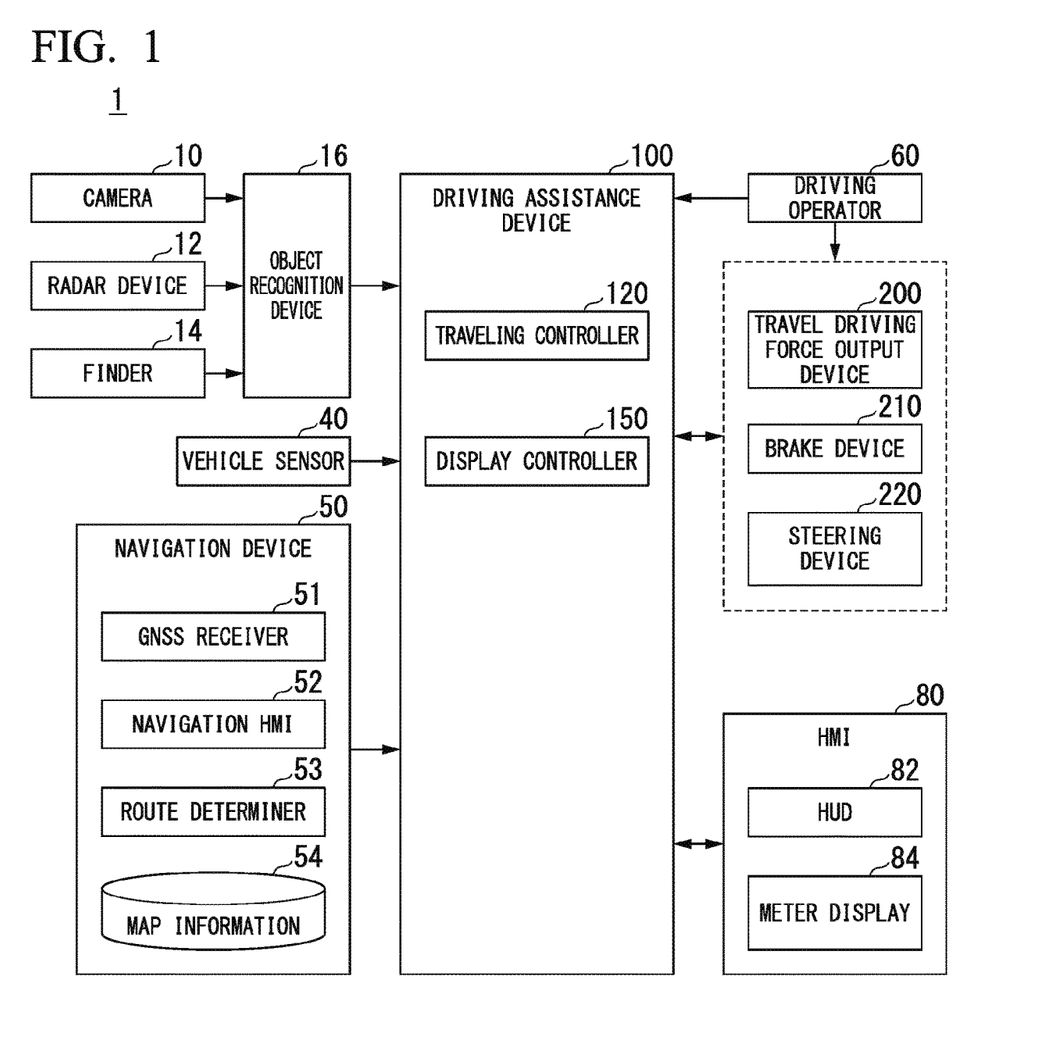
FIG. 1 is a configuration diagram of a vehicle system including a display system of an embodiment.

FIG. 1 is a configuration diagram of a vehicle system 1 including the display system of the embodiment. A vehicle (hereinafter referred to as a vehicle M) in which the vehicle system 1 is mounted is, for example, a vehicle such as a two-wheeled, three-wheeled, or four-wheeled vehicle. A driving source thereof is an internal combustion engine such as a diesel engine or a gasoline engine, an electric motor, or a combination thereof. The electric motor is operated using power generated by a generator connected to the internal combustion engine, or discharge power of a secondary battery or a fuel cell.

In FIG. 1 the vehicle system 1 includes, for example, a camera 10, a radar device 12, a finder 14, an object recognition device 16, a vehicle sensor 40, a navigation device 50, a driving operator 60, a human machine interface (HMI) 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted, or another configuration may be added thereto. A combination of the navigation device 50, the HMI 80, and a display controller 150 is an example of the "display system". The navigation device 50 is an example of a "route guide". A combination of a navigation HMI 52, a HUD 82 to be described below, and a meter display 84 is an example of a "display".

The camera 10 images an area around the vehicle M to generate a captured image. The camera 10 is, for example, a digital camera using a solid-state imaging element such as a charge coupled device (CCD) or a complementary metal oxide semiconductor (CMOS). The camera 10 is attached to any location on the vehicle M in which the vehicle system 1 is mounted. The area around the vehicle M includes an area in the front of the vehicle M, and may include areas to the sides or the rear of the vehicle M. In a case in which the camera 10 images the area in front of the vehicle M, the camera 10 is attached to an upper portion of a front windshield, a rear surface of a rearview mirror, or the like. The camera 10 may be a stereo camera.

The radar device 12 radiates radio waves such as millimeter waves in a predetermined radiation direction around the vehicle M vehicle and detects radio waves (reflected waves) reflected by an object to detect at least a position (distance and orientation) of the object. The object is, for example, another vehicle, an obstacle, or a structure present around the vehicle M. One or a plurality of radar devices 12 are attached to any locations on the vehicle M. The radar device 12 may detect a position and a speed of the object using a frequency modulated continuous wave (FM-CW) scheme.

The finder 14 is a light detection and ranging device, or a laser imaging detection and ranging (LIDAR) device that measures scattered light with respect to irradiation light that has been radiated in the predetermined radiation direction around the vehicle M to detect a distance to the object. One or a plurality of finders 14 are attached at any locations on the vehicle M.

The object recognition device 16 performs a sensor fusion process on detection results of some or all of the camera 10, the radar device 12, and the finder 14 to recognize a position, type, speed, and the like of an object around the vehicle M. The object recognition device 16 may recognize a shape of a road around the vehicle M through the sensor fusion process. The object recognition device 16 outputs recognition results to the driving assistance device 100.

The vehicle sensor 40 includes, for example, a vehicle speed sensor that detects a speed of the vehicle M, an acceleration sensor that detects an acceleration, a yaw rate sensor that detects an angular speed around a vertical axis, and an orientation sensor that detects a direction of the vehicle M.

The navigation device 50 includes, for example, a global navigation satellite system (GNSS) receiver 51, the navigation HMI 52, and a route determiner 53, and holds map information 54 in a storage device such as a hard disk drive (HDD) or a flash memory. The map information 54 is, for example, information in which a road shape is represented by links indicating roads and nodes connected by the links. The links include, for example, a traffic message channel (TMC) link. The TMC link is, for example, information for specifying a road section that is a distribution target when an external server distributes traffic information to the vehicle M, and is managed using an identification number for identifying each road section. The map information 54 may include a link shape, traffic regulations, a road type, a lane width, the number of lanes, a road structure, a road curvature, marker information, point of interest (POI) information, and the like. The marker information includes, for example, a road name, road identification information, a speed limit, traffic regulations (one-way traffic, a straight ahead lane, a right turn lane, and no parking), and information (for example, an area or a road) on a destination of a road. The map information 54 may include, for example, information on a center of a lane or information on a boundary between lanes.

The GNSS receiver 51 specifies a position of the vehicle M on the basis of a signal received from a GNSS satellite. The navigation HMI 52 includes a display device, a speaker, a touch panel, keys, and the like. The navigation HMI 52 may be partly or wholly shared with the HMI 80 to be described below. The route determiner 53, for example, determines a route from the position of the vehicle M (or any input position) specified by the GNSS receiver 51 to a route to a destination (including, for example, information on stops passed by when the vehicle M travels to the destination) input by an occupant (including a driver) using the navigation HMI 52, and a recommended lane based on the route to the destination by referring to the map information 54. The route determiner 53 divides the route on the map to the destination into a plurality of blocks (for example, divides the route every 100[m] in a traveling direction of the vehicle) and determines a recommended lane for each separate block. The route determiner 53 determines in which lane from the left the vehicle M travels. The route determiner 53 determines the recommended lane so that it becomes easy for the vehicle M to travel to a branching destination or a merging destination when there is a branching location or a merging location in the route on the map. The navigation device 50 performs route guidance using the navigation HMI 52 on the basis of the route determined by the route determiner 53 when the navigation device 50 operates.

The driving operator 60 is an operator that is used for the driver to control steering and a speed of the vehicle M through manual driving. The driving operator 60 includes, for example, an accelerator pedal, a brake pedal, a shift lever, and a steering wheel.

The HMI 80 presents various types of information to the occupant of the vehicle M and receives an input operation from the occupant. The HMI 80 includes, for example, some or all of various display devices, a light emitter, a speaker, a buzzer, a touch panel, various operation switches, keys, and the like. The HMI 80 may include, for example, an operation unit for performing switching between starting or ending of operations of a traveling controller 120 and the navigation device 50, and an operation unit for selecting a display configured to display an image controlled by the display controller 150. The HMI 80 includes, for example, the head up display (HUD) 82 and the meter display 84. Details of the HUD 82 and the meter display 84 will be described below.

The driving assistance device 100 includes, for example, the traveling controller 120 and the display controller 150. The traveling controller 120 executes driving assistance control of the vehicle M on the basis of information obtained from the object recognition device 16, the vehicle sensor 40, or the like when an instruction to start an operation of the traveling controller 120 is received by the HMI 80. For example, when the traveling controller 120 executes the ACC, the traveling controller 120 may control the travel driving force output device 200 and the brake device 210 so that the vehicle M travels in a state in which an inter-vehicle distance between the vehicle M and a preceding vehicle is kept constant, on the basis of information input from the camera 10, the radar device 12, and the finder 14 via the object recognition device 16.

That is, the traveling controller 120 performs acceleration and deceleration control (speed control) based on the inter-vehicle distance between the vehicle M and the preceding vehicle. When the traveling controller 120 executes the LKAS, the traveling controller 120 controls the steering device 220 so that the vehicle M travels while keeping a current traveling lane (lane keeping). That is, the driving assistance device 100 performs steering control for keeping the lane. When the traveling controller 120 executes the CMBS, the traveling controller 120 controls the travel driving force output device 200, the brake device 210, and the steering device 220 so that contact with an obstacle that the vehicle M is approaching is avoided. That is, the driving assistance device 100 performs acceleration and deceleration control and steering control for avoiding contact with an object.

The display controller 150 causes an image to be displayed on at least one of the navigation HMI 52, the HUD 82, and the meter display 84. The display on which the image is to be displayed may be set on the basis of instruction information received from an operation unit of the HMI 80 or may be set on the basis of a content of the image to be displayed. Details of a function of the display controller 150 will be described below.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The brake device 210 includes, for example, a brake caliper, a cylinder that transfers hydraulic pressure to the brake caliper, an electric motor that generates the hydraulic pressure in the cylinder, and a brake ECU. The brake ECU controls the electric motor according to information input from the driving operator 60 or information input from the traveling controller 120 so that a brake torque according to a braking operation is output to each wheel. The steering device 220 includes, for example, a steering ECU and an electric motor. The steering ECU drives the electric motor according to the information input from the driving operator 60 or the information input from the traveling controller 120 to change a direction of steerable wheels.

Figure 2:
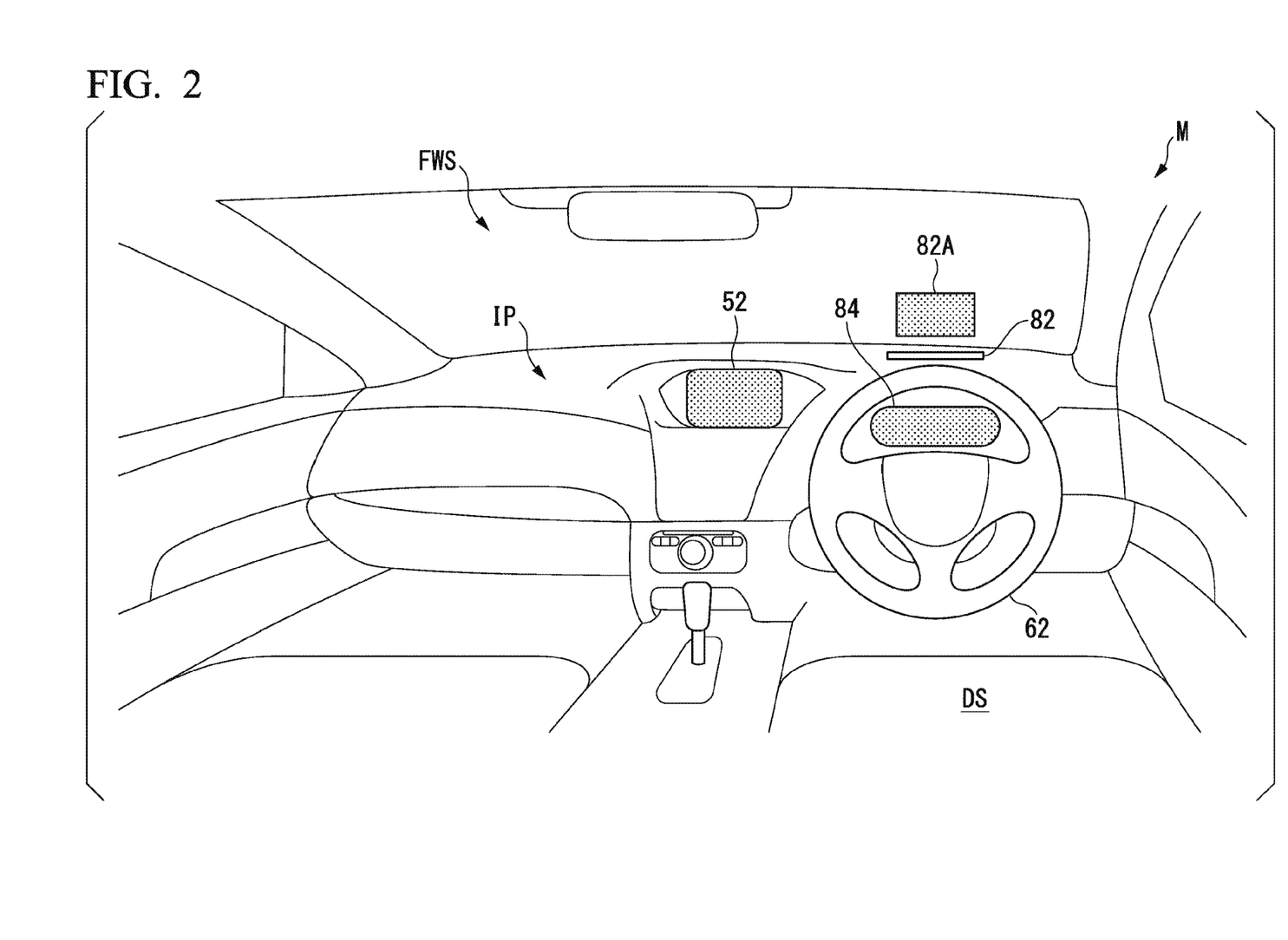
FIG. 2 is a diagram showing a configuration of a vehicle cabin of a vehicle M in which a navigation HMI, a HUD, and a meter display are mounted.

Next, the navigation HMI 52, the HUD 82, and the meter display 84 will be described. FIG. 2 is a diagram showing a configuration of a vehicle cabin of the vehicle M in which the navigation HMI 52, the HUD 82, and the meter display 84 are mounted. The navigation HMI 52 is a display device such as a liquid crystal display (LCD) or an organic electro luminescence (EL) display disposed at a center portion of an instrument panel IP, as shown in FIG. 2. The navigation HMI 52 includes, for example, a touch panel that receives an input operation by contact of a finger of the occupant. The navigation HMI 52 displays a shape of the road around the vehicle M, and a map and a route to a destination acquired using the map information 54. In this case, the navigation HMI 52 may display an image indicating, for example, the shape of the road around the vehicle M in a display aspect controlled by the display controller 150.

The HUD 82 is provided on or in the instrument panel IP, and projects light including an image onto a display area 82A of a portion of a front windshield FWS in front of a driver's seat DS, so that a virtual image is visible to a driver sitting in the DS. The front windshield FWS is a member having light transparency. The HUD 82 may be realized by a display device (for example, a liquid crystal display or an organic EL) having light transparency attached to the front windshield FWS, or may be a device that projects light onto a transparent member (a visor, lenses of glasses, or the like) included in a device mounted in a body of a person and to which a display device having light transparency has been attached.

The HUD 82, for example, causes the driver to visually recognize, as the virtual image, an image obtained by converting information for assisting the driver in driving into an image, in the display aspect controlled by the display controller 150. Examples of the information for assisting the driver in driving include information such as a shape of a road on which the vehicle M is traveling, a shape of a road on which the vehicle M is scheduled to travel in the future, a vehicle speed, a driving power distribution ratio, an engine speed, an operation state of a driving assistance function (for example, ACC, LKAS, and CMBS), a shift position, road marker information, and an intersection position. Hereinafter, the display controller 150 causing the HUD 82 to perform the above-described process is referred to as "causing the HUD 82 to display an image".

The meter display 84 is, for example, a display device that is provided in the vicinity in front of the driver's seat DS in the instrument panel IP and that the driver can visually recognize from a gap in a steering wheel 62, which is an example of the driving operator 60, or through the steering wheel 62. The meter display 84 is, for example, a display device such as an LCD or an organic EL display. The meter display 84 displays, for example, instruments such as a speedometer or a tachometer, and information on driving assistance. The meter display 84 may display an image indicating, for example, the shape of the road around the vehicle M in the display aspect controlled by the display controller 150 in an area other than an area in which instruments are displayed. Hereinafter, an example in which the display controller 150 controls the display aspect for the HUD 82 will be described.

[Display Controller]

Figure 3:
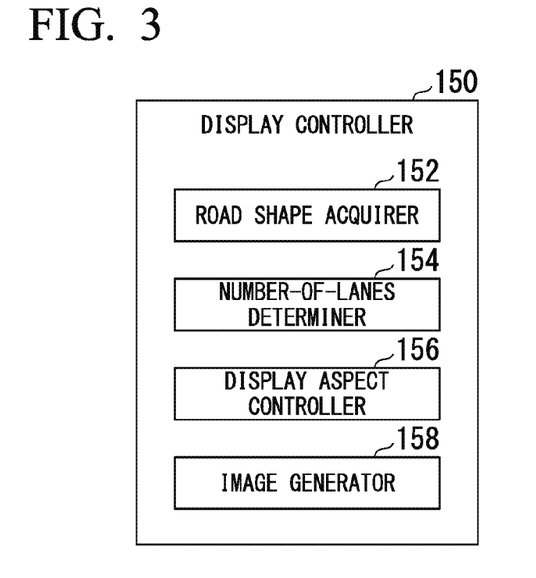
FIG. 3 is a functional configuration diagram of a display controller.

Next, a configuration example of the display controller 150 according to the embodiment will be described. FIG. 3 is a functional block diagram of the display controller 150. The display controller 150 includes, for example, a road shape acquirer 152, a number-of-lanes determiner 154, a display aspect controller 156, and an image generator 158. These components are realized, for example, by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device including a non-transitory storage medium) such as a hard disk drive (HDD) or a flash memory of the driving assistance device 100 in advance or may be stored in a removable storage medium (a non-transitory storage medium) such as a DVD or a CD-ROM and the storage medium may be mounted in a drive device so that the program may be installed in the HDD or the flash memory of the driving assistance device 100.

The road shape acquirer 152 acquires the shape of the road around the vehicle M. For example, the road shape acquirer 152 refers to the map information 54 on the basis of the position information of the vehicle M specified by the GNSS receiver 51 to acquire the shape of the road around the vehicle M or the number of lanes. The road shape acquirer 152 may acquire a captured image of an area in front of the vehicle M captured by the camera 10 instead of (or in addition to) acquiring the road shape or the number of lanes from the map information 54, analyze the acquired image, and acquire lanes drawn on the road, lanes divided by a structure such as a median strip, the number of lanes, road shapes, and the like.

The number-of-lanes determiner 154 determines whether the number of lanes of the road around the vehicle M acquired by the road shape acquirer 152 is an odd number or an even number. Specifically, the number-of-lanes determiner 154 determines whether the number of lanes in which the vehicle M can travel in the same direction as the traveling direction of the vehicle M is an odd number or an even number.

The display aspect controller 156 changes a display aspect of an image regarding a road shape to be displayed in the display area 82A of the HUD 82 when the number-of-lanes determiner 154 determines that the number of lanes is an odd number and when the number-of-lanes determiner 154 determines that the number of lanes is an even number. The display aspect includes, for example, an aspect regarding a display position and a lane width (width) of each lane in a case in which an image imitating lanes of a road is displayed. The display aspect may include an aspect such as a timing at which lanes are displayed, a display period, and a thickness, a color, a shape, and a pattern of the lanes. The display aspect may include an aspect such as a display position, a size, a shape, a color, and a pattern of an object such as a sign, a mark, a character, or a numerical value displayed on the HUD 82. Details of functions of the display aspect controller 156 will be described below.

The image generator 158 generates an image to be displayed on the HUD 82 on the basis of the display aspect determined by the display aspect controller 156, and causes the generated image to be displayed on the HUD 82.

[Display Aspect Controller]

Next, a specific example of functions of the display aspect controller 156 will be described. When the number of lanes of the road around the vehicle M is an odd number in the determination result of the number-of-lanes determiner 154, the display aspect controller 156 determines that a center lane among a plurality of lanes is to be positioned and displayed at a center in a width direction of the display area 82A of the HUD 82. The image generator 158 generates an image to be displayed on the HUD 82 on the basis of the determined content.

Figure 4:
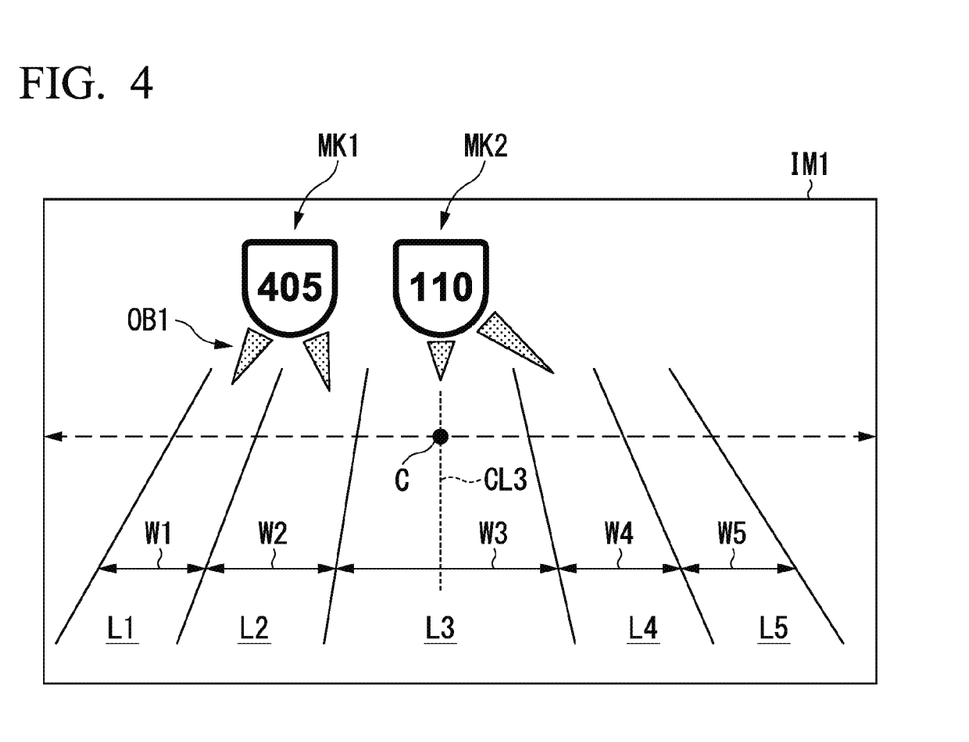
FIG. 4 is a diagram showing an example of an image that is generated by an image generator when the number of lanes is an odd number.

FIG. 4 is a diagram showing an example of an image IM1 that is generated by the image generator 158 when the number of lanes is an odd number. In the example of FIG. 4, it is assumed that lanes which the vehicle M can travel in the same direction as the traveling direction of the vehicle M are five lanes (L1 to L5). A size of the image IM1 is assumed to correspond to the display area 82A. The same applies to sizes of other images to be described below. In the following description, for example, it is assumed that the position information of the vehicle M is not obtained with high definition, and has recognition accuracy such that a traveling road can be specified, but a traveling lane cannot be recognized.

When the number-of-lanes determiner 154 determines that the number of lanes is an odd number, the display aspect controller 156 generates an image in which a plurality of lanes have been arranged so that a center line CL3 of a center lane L3 among the five lanes overlaps a center C in a width direction of the display area 82A (image IM1). The overlapping of the center line CL3 with the center C may include, for example, a predetermined tolerance on the basis of the number of lanes, a road shape (for example, a curved road), a size of the display area 82A, and the like.

The display aspect controller 156, for example, causes the image of the lanes L1 to L5 generated by the image generator 158 to be displayed so that the image becomes even left and right with respect to the lane L3. For respective lane widths W1 to W5 of the image of the lanes L1 to L5 generated in the image generator 158, the display aspect controller 156 displays the image so that the width W3 of the lane L3 positioned at the center C in the width direction of the display area 82A is greater than widths W1, W2, W4, and W5 of the other lanes, and the lane widths of the lanes on the outer side from the center C are smaller. For example, the display aspect controller 156 sets the lanes to be gradually thinner toward the outer side. Specifically, the display aspect controller 156 causes the image to be displayed so that the lane widths W2 and W4 of the lanes L2 and L4 on the outer side from the lane L3 are smaller than the vehicle width W3, and the lane widths W1 and W5 of the lanes L1 and L5 on the outer side from the lanes L2 and L4 are smaller than the lane widths W2 and W4. The lane widths W2 and W4 may be the same width, and the lane widths W1 and W5 may be the same width.

The display aspect controller 156 may cause the image generator 158 to generate an image of information on a sign of a lane (hereinafter referred to as marker information). The marker information includes, for example, information such as road name, road type, speed limit, traffic regulations (one-way traffic, a straight ahead lane, a right turn lane, and no parking). The display aspect controller 156 may acquire, for example, the marker information from the map information 54, or may analyze the image captured by the camera 10 and acquire the marker information through pattern matching or the like.

The display aspect controller 156 causes the marker information to be displayed at a predetermined timing. The predetermined timing includes, for example, a timing at which the vehicle M has traveled a predetermined distance, a timing at which a predetermined time has elapsed, and a timing at which a road or a road link (for example, an identification number of a TMC link) is switched. The predetermined timing may include, for example, a timing at which a junction such as branching or merging of a road is present hundreds of meters ahead.

In the example of FIG. 4, the display aspect controller 156 may cause marker information MK1 of the lanes L1 and L2, marker information MK2 of the lanes L3 and L4 to be displayed in an upper portion of the display area 82A. The display aspect controller 156 may cause instruction objects OB1 indicating the lanes that are targets of the marker information to be displayed. In the example of FIG. 4, the objects OB1 of the marker information MK1 indicate the lanes L1 and L2, and the objects OB1 of the marker information MK2 indicate the lanes L3 and L4. A layout of a display position, size, shape, and the like of the objects is not limited to the example of FIG. 4 and, for example, the display aspect controller 156 may cause the marker information MK1 and MK2 to be displayed near centers of the corresponding lanes or in a lower portion of the display area 82A.

Figure 5:
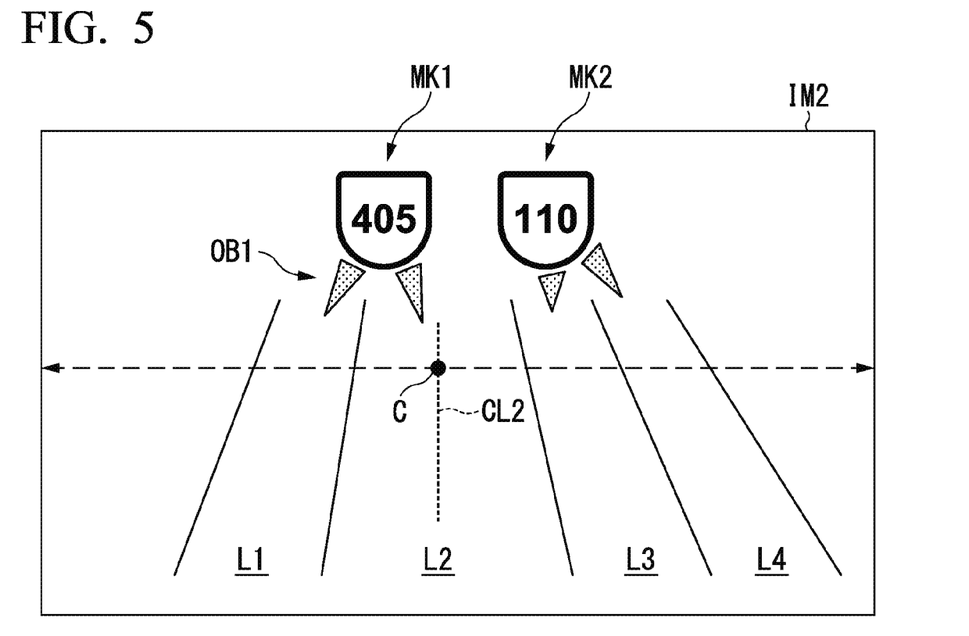
FIG. 5 is a diagram showing an example of an image that is generated by the image generator when the number of lanes is an even number and regulations of left-handed traffic are applied.
Figure 6:
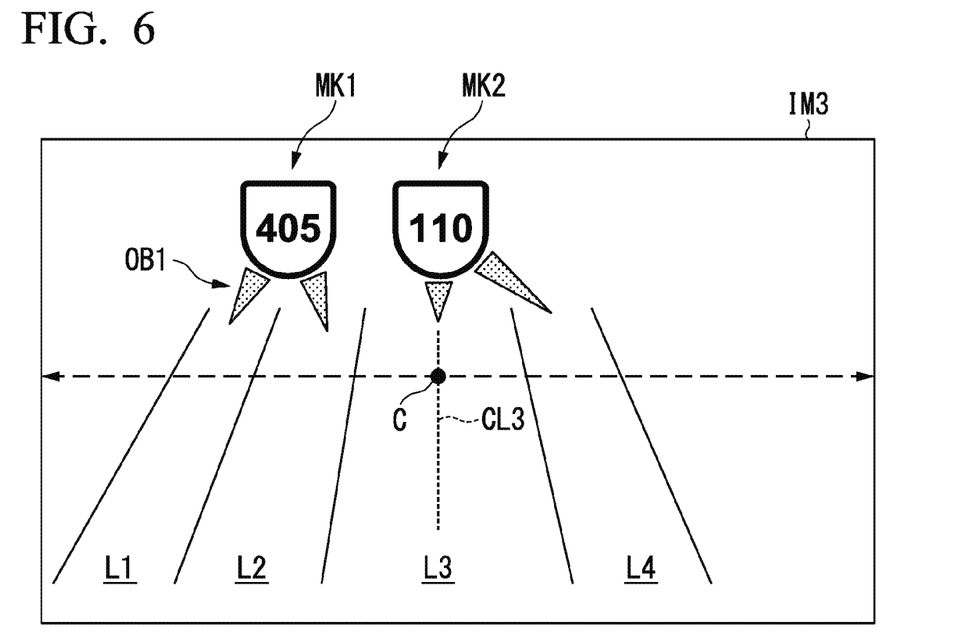
FIG. 6 is a diagram showing an example of an image that is generated by the image generator when the number of lanes is an even number and regulations of right-handed traffic are applied.

When the number-of-lanes determiner 154 determines that the number of lanes is an even number, the display aspect controller 156 determines a lane to be displayed at an approximate center in the width direction of the display area of the HUD on the basis of, for example, a traveling lane on the side determined according to regulations of a country or region in which the vehicle is located. The traveling lane determined according to the regulations is, for example, a traveling lane based on traffic regulations such as left-handed traffic or right-handed traffic. FIG. 5 is a diagram showing an example of an image IM2 generated by the image generator 158 when the number of lanes is an even number and regulations of left-handed traffic are applied. In the examples of FIG. 5 and FIG. 6 to be described below, lanes in which the vehicle M can travel in the same direction as the traveling direction of the vehicle M are four lanes (L1 to L4).

When the number-of-lanes determiner 154 determines that the number of lanes is an even number, the display aspect controller 156 determines whether a road is for left-handed traffic or right-handed traffic on the basis of regulations of a country or region in which the vehicle M travels. Whether the left-handed traffic is applied or right-handed traffic is applied for the lane in which the vehicle is traveling can be determined, for example, from traffic restrictions associated with the road corresponding to the position of the vehicle M by referring to the map information 54 on the basis of the position information of the vehicle M.

The display aspect controller 156 causes a traveling lane determined according to regulations for a second lane at a center among the plurality of lanes to be positioned and displayed at the center in the width direction of the display area 82A. When left-handed traffic is applied, the display aspect controller 156 generates an image in which a plurality of lanes have been arranged so that a center line CL2 of a lane L2 on the left side in a traveling direction among lanes L2 and L3 from a center among four lanes L1 to L4 overlaps a center C in a width direction of the display area 82A, that is, the image IM2.

For respective lane widths W1 to W4 of the image of the lanes L1 to L4 generated in the image generator 158, the display aspect controller 156 displays the image so that the width W2 of the lane L2 positioned at the center C in the width direction of the display area 82A is greater than widths W1, W3, and W4 of the other lanes, and the lane widths of the lanes on the outer side from the center C are smaller. For example, the display aspect controller 156 sets the lanes to be gradually thinner toward the outer side.

FIG. 6 is a diagram showing an example of an image IM3 generated by the image generator 158 when the number of lanes is an even number and regulations of right-handed traffic is applied. When right-handed traffic is applied, the display aspect controller 156 generates an image in which a plurality of lanes have been arranged so that a center line CL3 of a lane L3 on the right side in a traveling direction among lanes L2 and L3 from a center among four lanes L1 to L4 overlaps a center C in a width direction of the display area 82A, that is, the image IM3.

For respective lane widths W1 to W4 of the image of the lanes L1 to L4 generated in the image generator 158, the display aspect controller 156 displays the image so that the width W3 of the lane L3 positioned at the center C in the width direction of the display area 82A is greater than widths W1, W2, and W4 of the other lanes, and the lane widths of the lanes on the outer side from the center C are smaller. For example, the display aspect controller 156 sets the lanes to be gradually thinner toward the outer side.

When the number of lanes of the road is an even number, the display aspect controller 156 causes an image of the marker information or the like to be displayed at a predetermined timing, as in the case in which the number of lanes of the road is an odd number.

For example, when a lane of a road branches or a new lane merges, a position of the lane is often on the lane side associated with a traffic lane based on regulations defined in a country or region among a plurality of lanes. That is, in the case of left-handed traffic, branching or merging may often be present in a left end portion of a plurality of lanes, and in the case of right-handed traffic, branching or merging may often be present in a right end portion of a plurality of lanes. Therefore, in the embodiment, when there are a plurality of lanes, one lane to be displayed at a center is determined on the basis of regulations applied to the road, and the plurality of lanes are displayed on the basis of the determined lanes, and therefore, it is possible to reduce a degree of change in lane display when roads increase or decrease due to branching, merging, or the like, and to improve the visibility of the occupant even when lanes increase or decrease. Hereinafter, a case in which regulations of left-handed traffics are applied is mainly described.

Figure 7:
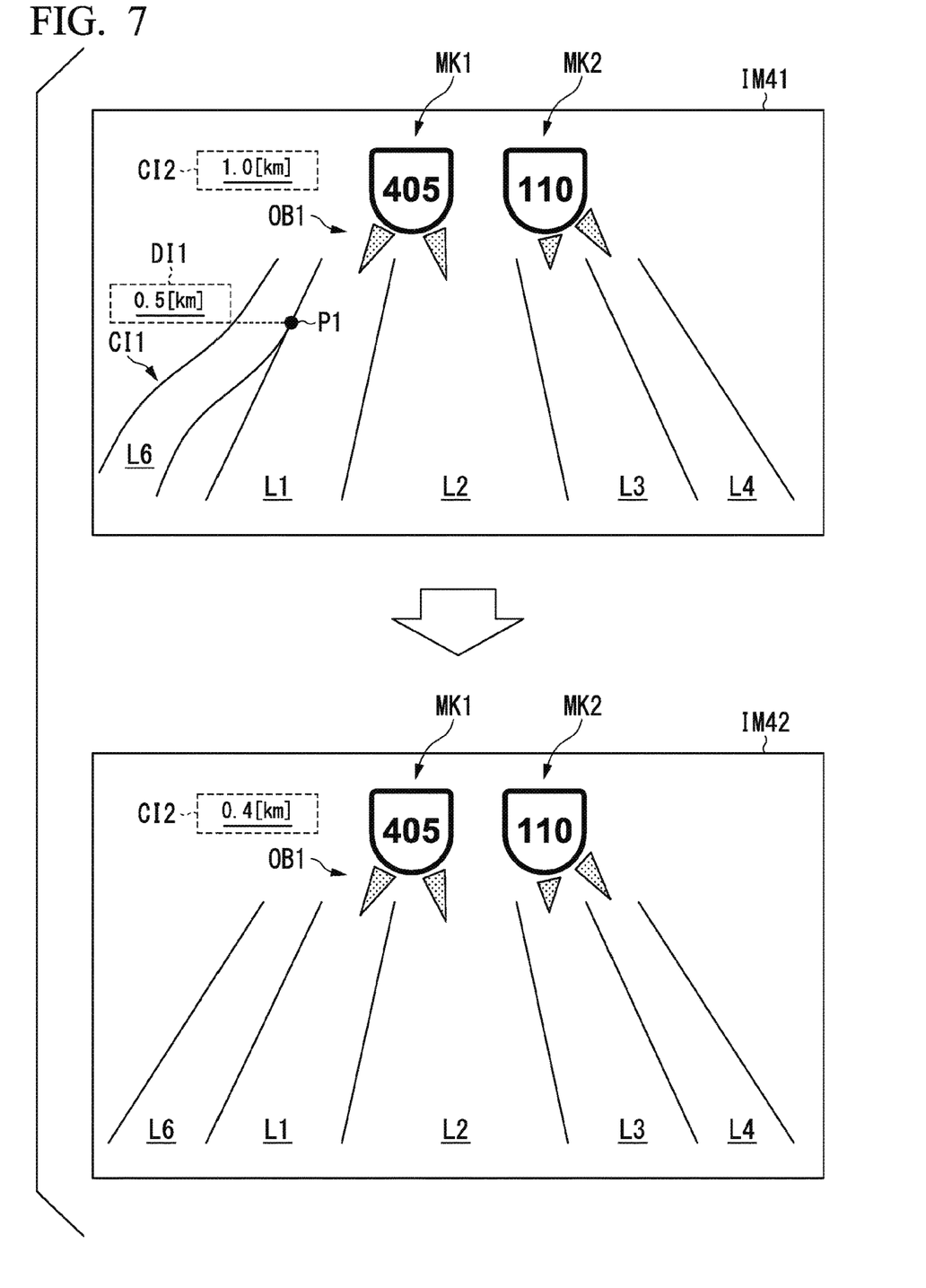
FIG. 7 is a diagram showing processing content of a display aspect controller in a case in which the number of lanes increases from an even number to an odd number due to merging of a lane.

The display aspect controller 156 prevents the display aspect of the lanes displayed on the HUD 82 from being changed when the number of lanes displayed on the HUD 82 changes from an odd number to an even number or from an even number to an odd number due to an increase in the number of lanes. FIG. 7 is a diagram showing processing content of the display aspect controller 156 when the number of lanes increases from an even number to an odd number due to merging of lanes. An example of FIG. 7 shows images IM41 and IM42 that are displayed in the display area 82A of the HUD 82 in a scene in which lanes in which the vehicle M can travel in the same direction as the traveling direction of the vehicle M increase from four lanes L1 to L4 to five lanes due to merging of a lanes L6. It is assumed that the lanes L1 to L4 are displayed in the display aspect shown in FIG. 5 described above.

The display aspect controller 156, for example, causes an image indicating lane shape change information CI1 indicating a state in which a shape of a lane changes to be displayed in the display area 82A together with the image indicating the lanes L1 to L4, the marker information, or the like when the vehicle M has reached a point the first predetermined distance before a point P1 at which a lane L6 merges. When the vehicle M has reached the point the first predetermined distance before the point P1 at which the lane L6 merges, the display aspect controller 156 derives a distance from a current position of the vehicle M to the point P1 at which the lane L6 merges, and causes an image indicating derived distance information DI1 to be displayed at a position associated with the point P1 at which branching occurs. The display aspect controller 156 derives a distance from the current position of the vehicle M to a branching and merging point (for example, a junction) at which the lane L6 branches, and causes derived distance information DI2 to be displayed in an upper portion in the display area 82A. The display aspect controller 156 derives a shape or numerical value corresponding to each predetermined time interval or each traveling distance, changes the lane shape change information CI1 and the distance information DI1 and DI2 into the derived shape or numerical value, and causes the shape or numerical value to be displayed on the HUD 82. The display aspect controller 156 does not change the display aspect for the lanes L1 to L4 even when the lane shape change information CI1 or the distance information DI1 and DI2 are displayed. As a result, after the lanes increase to the five lanes, an image as shown in the image IM42 in which a degree of change in display content before and after the lanes increase is low is displayed.

Figure 8:
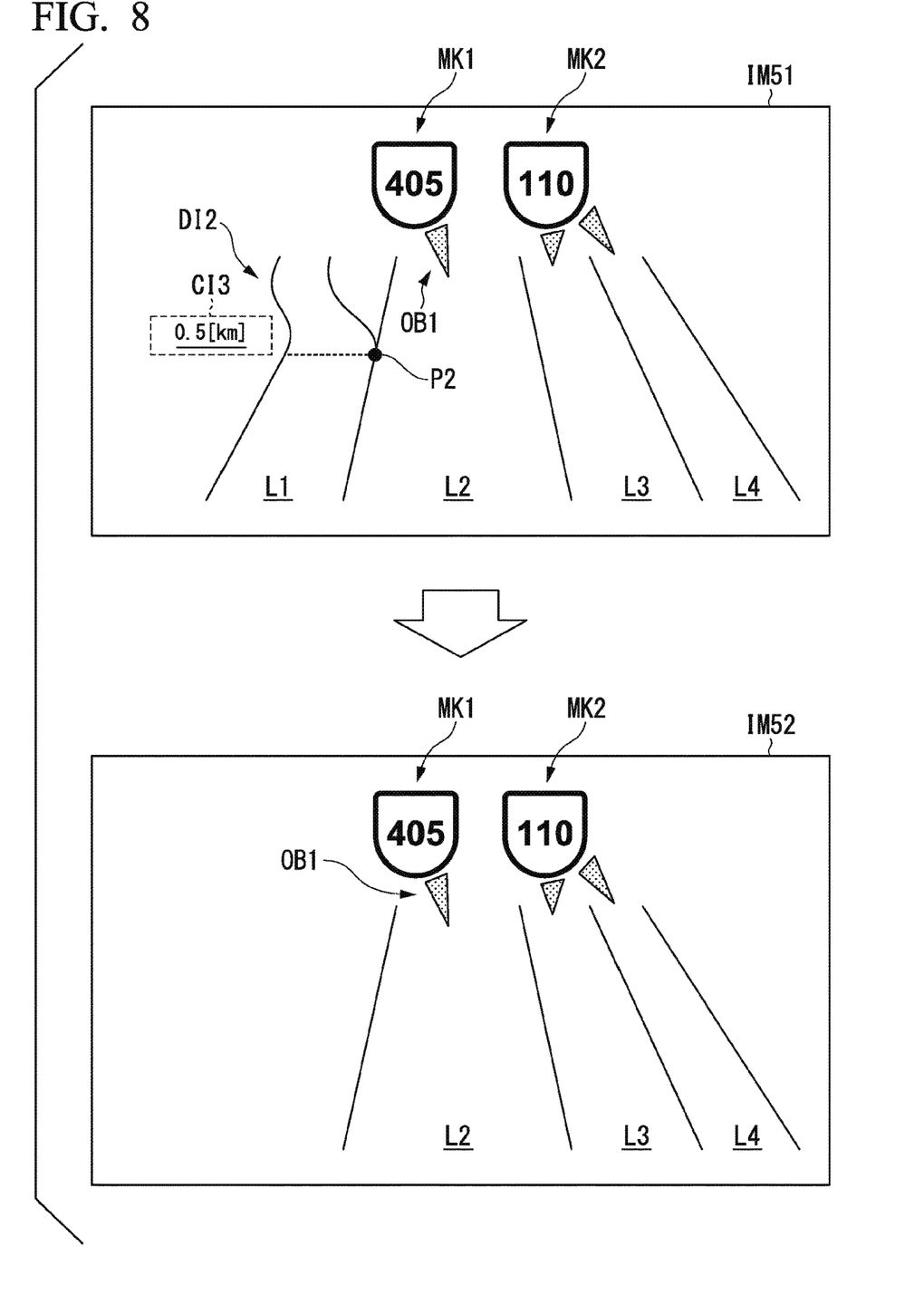
FIG. 8 is a diagram showing processing content of the display aspect controller in a case in which the number of lanes decreases from an even number to an odd number due to branching of a lane.

FIG. 8 is a diagram showing processing content of the display aspect controller 156 when the number of lanes decreases from an even number to an odd number due to branching of the lanes. An example of FIG. 8 shows images IM51 and IM52 displayed on the display area 82A of the HUD 82 in a scene in which the number of lanes in which the vehicle M can travel in the same direction as the traveling direction of the vehicle M decreases from four lanes L1 to L4 to three lanes L2 to L4 due to branching of the lane L1. It should be noted that the lanes L1 to L4 are displayed in the display aspect shown in FIG. 5 described above.

When the vehicle M has reached a point the first predetermined distance before a point P2 at which the lane L1 branches, the display aspect controller 156 causes lane shape change information CI2 indicating a state in which the shape of the lane changes to be displayed in the display area 82A together with the lanes L1 to L4, the marker information, or the like. When the vehicle M has reached a point the first predetermined distance before the point P2 at which the lane L6 merges, the display aspect controller 156 derives a distance from a current position of the vehicle M to the point P2 at which the lane L1 branches, and causes derived distance information DI3 to be displayed at a position associated with the point P2 at which branching occurs. The lane shape change information CI2 and the distance information DI3 are displayed with a shape or a numerical value changed at predetermined time intervals or for each traveling distance. The display aspect controller 156 does not change the display aspect for the lanes L2 to L4 even when the lane shape change information CI2 or the distance information DI3 is displayed. As a result, after the lanes decrease to the three lanes, an image as shown in the image IM52 in which a degree of change in display content before and after the lanes decrease is low is displayed.

When the vehicle M is traveling on the basis of the route to the destination set in the navigation device 50, the display aspect controller 156 may cause information on the route set by the navigation device 50 to be displayed on the HUD 82. In this case, when the vehicle M has reached a point the second predetermined distance before a point at which the vehicle M is to perform lane change on the basis of the route, the display aspect controller 156 causes information on the lane change to be displayed on the HUD 82.

Figure 9:
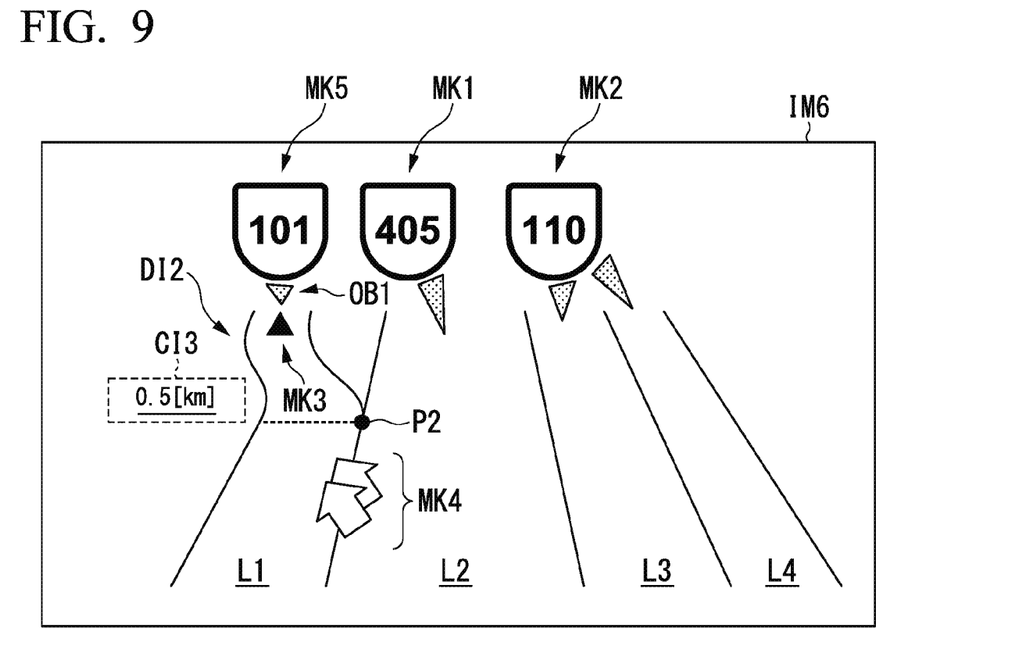
FIG. 9 is a diagram showing an example of an image in which information on lane change is displayed.

FIG. 9 is a diagram showing an example of an image IM6 in which information on lane change is displayed. In the example of FIG. 9, a scene in which the branch point P2 of the lane L1 in FIG. 8 described above is displayed is shown. It is assumed that the vehicle M is traveling in a lane L2 among four lanes L1 to L4, and the lane L1 is a route for reaching the destination determined by the route determiner 53 of navigation device 50.

In this case, the display aspect controller 156 causes an image indicating a recommendation mark MK3 indicating a recommended lane based on the travel route to the destination set by the navigation device 50 to be displayed at a position associated with a display position of the lane L1. When the vehicle M has reached a point the second predetermined distance before the point at which the vehicle M is to perform lane change on the basis of the route (for example, the branch point P2), the display aspect controller 156 causes an image indicating a direction of the recommended lane with respect to the traveling lane of the vehicle M and a lane change mark MK4 for prompting the driver to change the lane to be displayed on a division line between the lanes. In the image IM6 shown in FIG. 9, the recommendation mark MK3 is displayed at an end portion in the traveling direction of the lane L1, and the lane change mark MK4 is displayed on a division line between the lane L1 and the lane L2. When the vehicle M has reached a point the third predetermined distance before the point at which the vehicle M is to perform lane change on the basis of the route (for example, the branch point P2), the display aspect controller 156 causes an image indicating marker information MK5 of a road that is a destination to which a branching road is connected or an instruction object OB1 indicating a lane that is a target of the marker information MK5 to be displayed on the HUD 82.

The first predetermined distance, the second predetermined distance, and the third predetermined distance described above are preferably the same distances. By setting the distances as the same distances, a display timing is determined on the basis of the distance regardless of the road shape, the vehicle speed, the presence or absence of other vehicles around the vehicle M, or the like, such that the lane shape change information or the distance information can be displayed to the occupant at one time. By setting the display timings as the same timings, it is possible to make it easy for the occupant to ascertain the display timing, and as a result, to improve visibility of information to be displayed.

Figure 10:
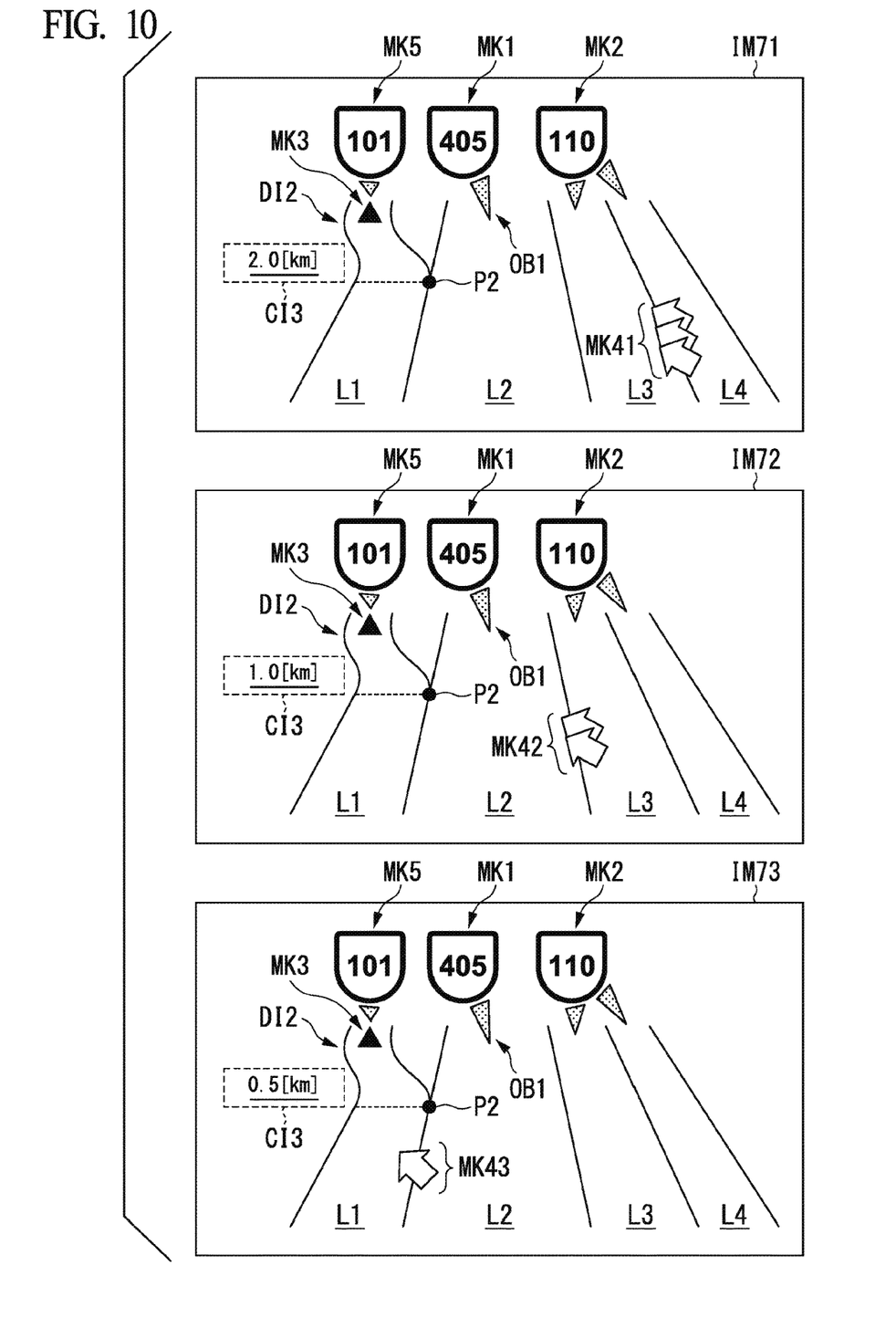
FIG. 10 is a diagram showing changing a display aspect of lane change marks.

A display aspect such as a shape, size, or a display position of the image indicating the lane change mark MK4 is not limited thereto and, for example, a display form of the mark image may be changed according to the number of lanes between the recommended lane and the traveling lane of the vehicle M. FIG. 10 is a diagram showing changing the display aspect of the lane change mark MK4. In an example of FIG. 10, it is assumed that the same scene as that of FIG. 9 is shown. For example, when the vehicle M is traveling in the lane L4, the number of times of lane change until the vehicle M moves from the traveling lane L4 to the recommended lane L1 is three. Therefore, the display aspect controller 156 causes the image generator 158 to generate a lane change mark MK41 represented by partially overlapping a number of arrows (for example, three arrows) associated with the number of times of lane change, and causes an image IM71 in which the generated lane change mark MK41 has been displayed on a division line between the lane L3 and the lane L4 to be displayed on the HUD 82.

Similarly, when the vehicle M is traveling in the lane L3, the display aspect controller 156 causes an image IM72 in which a lane change mark MK42 represented by partially overlapping arrows of the number (for example, two arrows) associated with the number of times of lane change to the recommended lane L1 (two times) has been displayed on a division line between the lane L2 and the lane L3 to be displayed on the HUD 82. Similarly, when the vehicle M is traveling in the lane L2, the display aspect controller 156 causes an image IM73 in which a lane change mark MK43 representing an arrow of the number (for example, one arrow) associated with the number of times of lane change to the recommended lane L1 (one time) has been displayed on a division line between the lane L1 and the lane L2 to be displayed on the HUD 82. Accordingly, the occupant can easily ascertain the position of the recommended lane and the number of times of lane change from the lane change marks MK41 to MK43.

Further, in the example of FIG. 10, the display aspect controller 156 may take time to execute the lane change once into consideration to make timings at which the respective lane change marks MK41 to MK43 are displayed different according to the number of times of lane change. For example, the display aspect controller 156 makes the timing at which the lane change mark MK41 is displayed earlier than the timings at which the lane change marks MK42 and MK43 are displayed by a first predetermined time. The display aspect controller 156 makes the timing at which the lane change mark MK42 is displayed earlier than the timing at which the lane change mark MK43 is displayed by a second predetermined time. The first predetermined time and the second predetermined time may be set on the basis of the distance from the point P2 or the vehicle speed. Accordingly, the occupant can ascertain the number of times of lane change from change in the display aspect of the mark images IM41 to IM43, and can change the lane with a margin.

The display aspect controller 156 may cause some or all of images of display targets such as the marker information, the object, the mark, and the lane described above to be displayed as animation images.

[Processing Flow]

Figure 11:
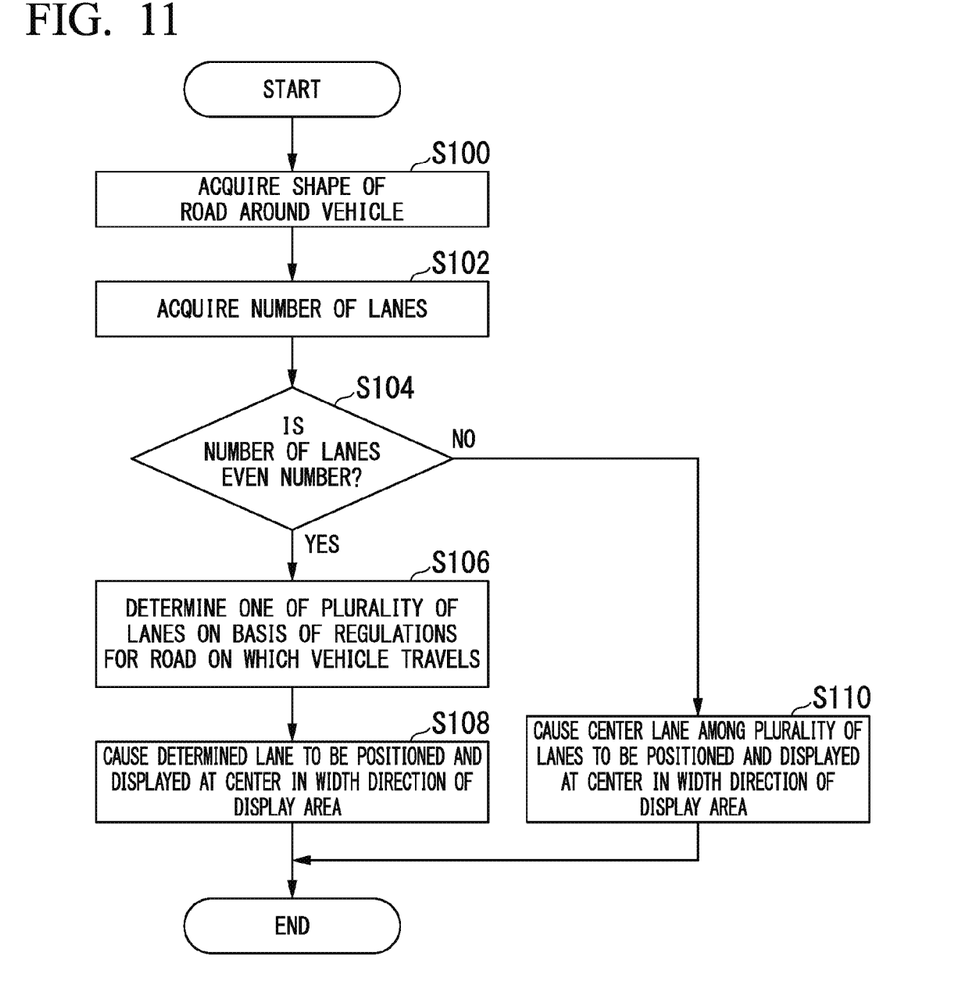
FIG. 11 is a flowchart showing an example of a flow of a process that is executed by the display system of the embodiment.

FIG. 11 is a flowchart showing an example of a flow of a process that is executed by the display system of the embodiment. The process of this flowchart is repeatedly performed, for example, in predetermined periods. In the example of FIG. 11, the road shape acquirer 152 refers to the map information 54 on the basis of the position information of the vehicle M to acquire the shape of the road around the vehicle M (step S100). Then, the number-of-lanes determiner 154 acquires the number of lanes in which the vehicle M can travel in the same direction as the traveling direction of the vehicle M on the basis of the road shape acquired by the road shape acquirer 152 (step S102). Then, the number-of-lanes determiner 154 determines whether the acquired number of lanes is an even number (step S104).

When it is determined that the number of lanes is an even number, the display aspect controller 156 determines one of the plurality of lanes on the basis of legal restrictions for a road on which the vehicle M travels (step S106). Then, the image generator 158 causes the determined lane to be positioned at the center in the width direction of the display area, and displays the lanes present around the vehicle M (step S108).

When it is determined in the process of step S104 that the number of lanes is an odd number, the image generator 158 causes a center lane among the plurality of lanes to be positioned at the center in the width direction of the display area, and displays the lanes present around the vehicle M (step S110). Accordingly, the process of this flowchart ends.

According to the embodiment described above, it is possible to improve visibility of an image to be displayed, by changing the display aspect of the lanes in a case in which the number of lanes included in the shape of the road around the vehicle M is an odd number and a case in which the number of lanes included in the shape of the road around the vehicle M is an even number. Specifically, it is possible to reduce the degree of change of the lanes, for example, due to an increase or decrease in the number of lanes and improve visibility of an occupant even when there is an increase or decrease in the lanes, by causing the center lane among the plurality of lanes to be positioned and displayed at the center in the width direction of the display area when the number of lanes of a road around the vehicle M is an odd number, and determining one of the plurality of lanes on the basis of regulations of a country or region in which the vehicle M is located and causing the determined lane to be positioned and displayed at the center in the width direction of the display area, when the number of lanes of a road around the vehicle M is an even number.

According to the embodiment, for example, it is possible to display an image regarding lanes on the basis of the road shape obtained from the map information 54 even in a situation in which it is difficult to recognize the lanes using the camera 10 or the like due to lane abrasion, poor visibility, or the like, to thereby present the road shape to the occupant and assist the driver in driving.

[Hardware Configuration]

Figure 12:
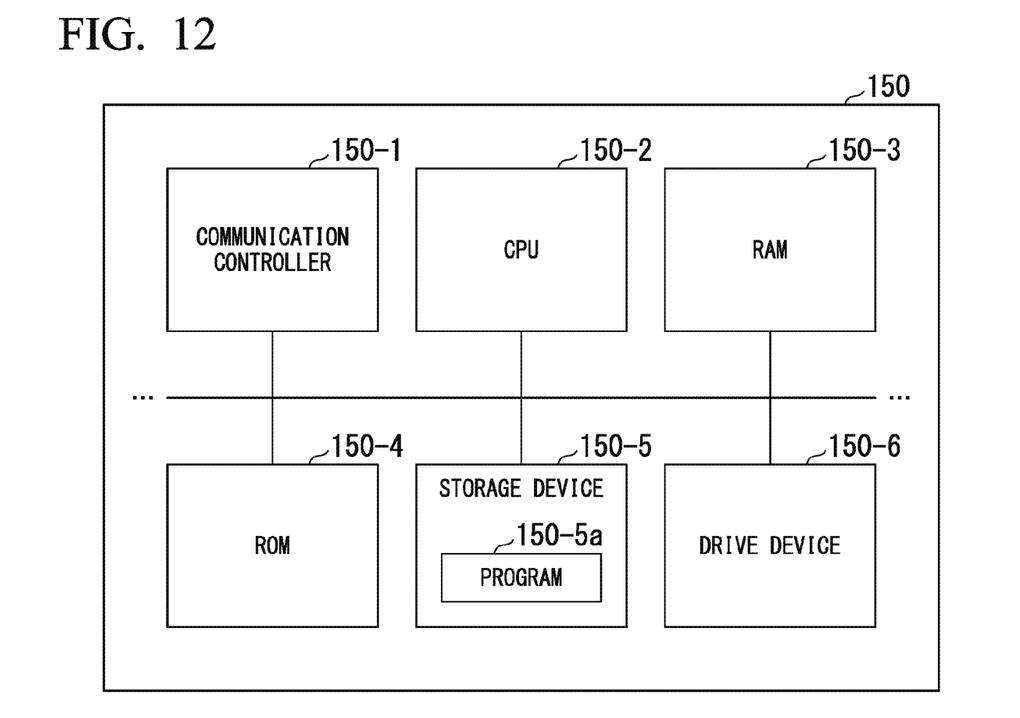
FIG. 12 is a diagram showing an example of a hardware configuration of the display controller of the embodiment.

The display controller 150 of the display system of the embodiment described above is realized by, for example, a configuration of computer hardware as shown in FIG. 12. FIG. 12 is a diagram showing an example of a hardware configuration of the display controller 150 according to the embodiment.

The display controller 150 has a configuration in which a communication controller 150-1, a CPU 150-2, a RAM 150-3, a ROM 150-4, a storage device 150-5 such as a flash memory or an HDD, and a drive device 150-6 are connected to each other by an internal bus or a dedicated communication line. A portable storage medium such as an optical disc is mounted in the drive device 150-6. A program 150-5a stored in the storage device 150-5 is developed into the RAM 150-3 by a DMA controller (not shown) or the like and executed by the CPU 150-2 to realize functional units of the display controller 150. A program referred to by the CPU 150-2 may be stored in a portable storage medium mounted in the drive device 150-6 or may be downloaded from another device via a network NW.

The above embodiment can be represented as follows.

A display system including a storage device and a hardware processor that executes a program stored in the storage device, wherein the hardware processor is configured to acquire a shape of a road around a vehicle, cause an image including the acquired road shape to be displayed on a display, and change a display aspect of lanes to be displayed on the display on the basis of whether the number of lanes of the road around the vehicle is an odd number or an even number, by executing the program.

Although a mode for carrying out the present invention has been described above using the embodiment, the present invention is not limited to the embodiment at all, and various modifications and substitutions may be made without departing from the spirit of the present invention.

What is claimed is:

1. A display system comprising:
    a display configured to display an image;
    a road shape acquirer configured to acquire a shape of a road around a vehicle; and
    a display controller configured to cause an image including the road shape acquired by the road shape acquirer to be displayed on the display,
    wherein the display controller is configured to change a display aspect of lanes to be displayed on the display, on the basis of whether the number of lanes of the road around the vehicle is an odd number or an even number.

2. The display system according to claim 1,
    wherein the display controller is configured to
    cause a center lane among a plurality of lanes to be positioned and displayed at a center in a width direction of the display when the number of lanes of the road around the vehicle is an odd number, and
    determine one of the plurality of lanes on the basis of regulations for the road and cause the determined lane to be positioned and displayed at the center in the width direction of the display, when the number of lanes of the road around the vehicle is an even number.

3. The display system according to claim 2, wherein the display controller is configured to cause a traveling lane determined according to regulations for a second lane at a center among a plurality of lanes to be positioned and displayed at the center in the width direction of the display, when the number of lanes of the road around the vehicle is an even number.

4. The display system according to claim 2, wherein the display controller is configured not to change a display aspect of the lane to be displayed on the display when the number of lanes changes from an even number to an odd number due to an increase or decrease in the number of lanes displayed on the display.

5. The display system according to claim 1, wherein the display controller is configured to cause the lanes to be displayed so that a width of a lane positioned at a center in a width direction of the display is greater than widths of other lanes, and the width of the lane on the outside from the center is smaller than the width of the lane positioned at the center.

6. The display system according to claim 1, wherein the display controller is configured to cause lane shape change information indicating a state in which a shape of the lane changes to be displayed on the display when the vehicle has reached a point at which the number of lanes in which the vehicle is able to travel in the same direction as a traveling direction of the vehicle increases or decreases or a point a first predetermined distance before a point at which the lane branches.

7. The display system according to claim 6, further comprising:
    a route guide configured to perform guidance for a route to a destination of the vehicle,
    wherein the display controller is configured to cause information on the route determined by the route guide to be displayed on the display, and cause information on lane change to be displayed on the display when the vehicle has reached a point a second predetermined distance before a point at which the vehicle is to perform lane change on the basis of the route.

8. The display system according to claim 7, wherein the display controller is configured to cause a road sign of a destination to which the branching road is connection to be displayed on the display when the vehicle has reached a point a third predetermined distance before a point at which the lane branches.

9. The display system according to claim 8, wherein the first predetermined distance, the second predetermined distance, and the third predetermined distance are the same distances.

10. A display control method comprising:
    acquiring, by a computer, a shape of a road around a vehicle;
    causing, by the computer, an image including the acquired road shape to be displayed on a display; and
    changing, by the computer, a display aspect of lanes to be displayed on the display, on the basis of whether the number of lanes of the road around the vehicle is an odd number or an even number.

11. A computer-readable non-transitory storage medium storing a program causing a computer to:
    acquire a shape of a road around a vehicle;
    cause an image including the acquired road shape to be displayed on a display; and
    change a display aspect of lanes to be displayed on the display, on the basis of whether the number of lanes of the road around the vehicle is an odd number or an even number.

* * * * *